(12) United States Patent
Colette et al.

(10) Patent No.: US 7,971,799 B2
(45) Date of Patent: Jul. 5, 2011

(54) HEATING ASSEMBLY FOR A HEATING, VENTILATING AND/OR AIR CONDITIONING INSTALLATION FOR A VEHICLE CABIN

(75) Inventors: Olivier Colette, Le Mesnil Saint Denis (FR); Frederic Pierron, Rambouillet (FR); Gilbert Terranova, Le Perray en Yvelines (FR); Roland Haussmann, Wiesloch (DE)

(73) Assignee: Valeo Climatisation S.A., La Verriere (FR)

( * ) Notice: Subject to any disclaimer, the term of this patent is extended or adjusted under 35 U.S.C. 154(b) by 1157 days.

(21) Appl. No.: 11/105,282

(22) Filed: Apr. 13, 2005

(65) Prior Publication Data

US 2005/0242203 A1 Nov. 3, 2005

(30) Foreign Application Priority Data

Apr. 13, 2004 (FR) ..................................... 04 03903

(51) Int. Cl.
*B60H 1/00* (2006.01)
*B60H 1/22* (2006.01)
*B60L 1/02* (2006.01)
*B60H 1/02* (2006.01)

(52) U.S. Cl. .............. 237/12.3 B; 237/2 A; 237/12.3 R; 237/12.3 A; 165/41; 219/202; 219/205

(58) Field of Classification Search ............. 237/12.3 R, 237/12.3 B, 2 A, 12.3 A; 165/41, 42; 219/202, 219/205
See application file for complete search history.

(56) References Cited

U.S. PATENT DOCUMENTS

| | | | | |
|---|---|---|---|---|
| 4,398,081 A | * | 8/1983 | Moad | 219/202 |
| 4,910,388 A | * | 3/1990 | Lorenz et al. | 219/543 |
| 5,239,163 A | * | 8/1993 | Brouwers | 219/202 |
| 5,255,733 A | * | 10/1993 | King | 165/299 |
| 5,291,960 A | * | 3/1994 | Brandenburg et al. | 180/65.2 |
| 5,665,261 A | * | 9/1997 | Damsohn et al. | 219/504 |
| 5,906,177 A | * | 5/1999 | Okabe et al. | 122/26 |
| 5,995,711 A | * | 11/1999 | Fukuoka et al. | 392/347 |
| 6,055,360 A | * | 4/2000 | Inoue et al. | 392/485 |
| 6,124,570 A | * | 9/2000 | Ebner et al. | 219/202 |
| 6,166,351 A | * | 12/2000 | Yamamoto | 219/202 |
| 6,178,292 B1 | * | 1/2001 | Fukuoka et al. | 392/485 |
| 6,265,692 B1 | * | 7/2001 | Umebayahi et al. | 219/202 |
| 6,383,672 B1 | * | 5/2002 | Fujita | 429/26 |
| 6,448,535 B1 | * | 9/2002 | Ap | 219/208 |
| 6,454,180 B2 | * | 9/2002 | Matsunaga et al. | 237/12.3 B |
| 6,595,433 B2 | * | 7/2003 | Ap et al. | 237/12.3 B |

(Continued)

FOREIGN PATENT DOCUMENTS

DE 100 32 099 C1 4/2002

(Continued)

*Primary Examiner* — Steven B McAllister
*Assistant Examiner* — Patrick F. O'Reilly, III
(74) *Attorney, Agent, or Firm* — Howard & Howard Attorneys PLLC

(57) ABSTRACT

The invention is directed to a heating assembly comprising, in combination, a main radiator (1) for fluid flow and an electric radiator. The latter is disposed on one face of the main radiator (1) defining its general plane, and consists of a plurality of independent heating elements (6). Each of these heating elements (6) comprises an elementary electrical heating body (7), having connecting means (31, 31') for connection to an electrical power source, and a finned element (8). These heating elements (6) are assembled on a connecting structure of the electric radiator on the face of the main radiator (1).

17 Claims, 4 Drawing Sheets

U.S. PATENT DOCUMENTS

2007/0084858 A1 * 4/2007 Pierron et al. ............... 219/716

FOREIGN PATENT DOCUMENTS

| | | | |
|---|---|---|---|
| EP | 0 893 937 | A2 | 1/1999 |
| EP | 0 919 409 | A1 | 6/1999 |
| EP | 0 937 595 | A2 | 8/1999 |
| EP | 1 130 337 | A2 | 9/2001 |
| EP | 1 253 808 | A2 | 10/2002 |
| EP | 1 318 695 | A2 | 6/2003 |
| JP | 08091041 | A * | 4/1996 |

* cited by examiner

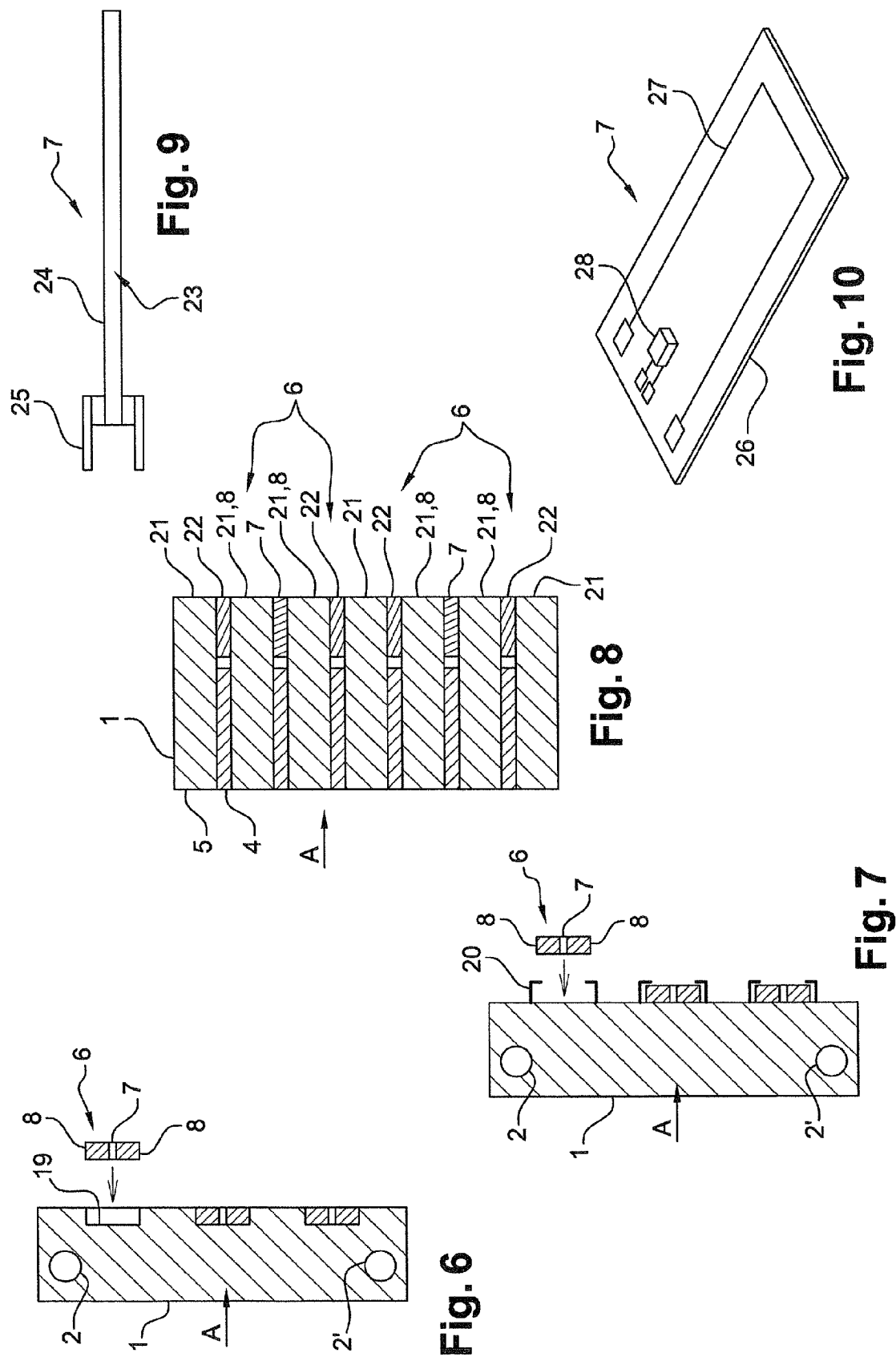

HEATING ASSEMBLY FOR A HEATING, VENTILATING AND/OR AIR CONDITIONING INSTALLATION FOR A VEHICLE CABIN

TECHNICAL FIELD OF THE INVENTION

The invention lies in the field of heating, ventilating and/or air conditioning installations, especially for a vehicle cabin, and more particularly that of heating radiators comprised in such installations for the purpose of modifying the temperature of the ventilated air.

STATE OF THE ART

It will be recalled that heating, ventilating and/or air conditioning installations for vehicle cabins comprise an air circuit in which a heating assembly is interposed. Under current practice, the latter comprises, in combination, a main radiator for flow of the liquid used for cooling the engine of the vehicle, to which an electric radiator is joined as an accessory. The main radiator is generally flat, and includes inlet and outlet ports for the liquid and a plurality of tubes for flow of the fluid in the tubes from one of the said ports to the other. Finned elements are interposed between the tubes in order to facilitate heat exchange between the main radiator and the air. This arrangement is such that the modification of the temperature of the ventilated air is obtained by passing it across the finned elements, the temperature of which is changed by its contact with the set of tubes.

The problem arises of how to organise the attachment of the electric radiator to the main radiator, having regard to various design constraints relating to the size of the heating assembly, which is required to be restricted so as to give the best possible output. However, optimum compactness in the heating assembly has to take into account the resulting closeness of the main radiator and electric radiator. This closeness to each other tends to give rise to inappropriate heating by the electric radiator of the liquid flowing inside the main radiator, and this results in a loss of the required output of the electric radiator for heating the air. In addition, the organisation of the main and electric radiators, both independently and as regards their juxtaposition, has to tend to reduce the obstacles which they present to the flow of air through them, whereby to avoid loss of energy in the ventilated air.

For example, a first known general solution consists in placing the electric radiator downstream of the main radiator in the direction of air flow. In current practice, the latter, being arranged as a main radiator, consists of a generally flat body comprising finned elements between which there extends an electric heating member, which in this case consists of resistances or the like. An electronic control unit may be disposed at right angles to the heating members for bringing the latter into use. Such an electric radiator is disposed parallel to and close to the main radiator, by means of a common carrying chassis. Reference can for example by made to the document FR 2 771 342 (Valeo Climatisation). A solution of that kind is favourable to the output of the heating assembly, by optimising the heat exchanges between the air and the various radiators, and by limiting the heating of the coolant liquids flowing in the main radiator by the electric radiator. In addition, a heating assembly of this kind, being modular, offers the choice of either attaching or not attaching the electric radiator to the main radiator. However, the advantages achieved are obtained at the price of the heating assembly having, as a result, a large size and inappropriate complexity of its structure, in particular because of the way in which the junction is obtained between the two radiators, main and electric.

A second known general solution consists in integrating the electric heating bodies between the fins and the tubes of the main radiator. Reference may for example be made to the document FR 2 724 874 (Behr), which describes a heating assembly of this kind. More precisely, the main radiator is equipped with electrical resistances of the positive temperature coefficient (PTC) type, which are interposed between and along a number of finned elements of the main radiator, by selective replacement of the tubes of the main radiator. Such an arrangement enables the size of the heating assembly to be considerably reduced. However, the interposing of the PTC elements between the fins affects the output of the main radiator, which is partially deprived of the tubes which have been replaced by the PTC elements. In addition, the structure of the heating assembly in a successive alternation of tubes, finned elements and PTC elements gives rise to an undesirable close proximity of the PTC elements of the electric radiator to the tubes of the main radiator, and the consequence of this is heat transfer between them which has an effect on the output of the PTC elements for heating the air. In addition, this solution is detrimental to the modular character of the heating assembly, the main radiator and the electric radiator being unable to offer such a feature because they are intimately joined together.

Finally, it will be clear from the foregoing that none of the current solutions in the field is able to produce a fully satisfactory result.

OBJECT OF THE INVENTION

The present invention lies in the search for a compromise between the various design constraints discussed above, and in particular it aims to propose a heating assembly for a heating, ventilating and/or air conditioning installation, especially for a cabin of a vehicle, in which a main radiator for fluid flow is associated with an electric radiator, and the structures of which satisfy in the best possible way the requirements identified in this field.

The inventive step in the present invention lay in choosing to arrange the electric radiator so that it follows a surface for heat exchange with the air which is to be heated, which is distinct from that of the main radiator, whereby to avoid proximity between the tubes of the main radiator and the heating members of the electric radiator, which is liable to affect the output of the latter for heating of the air. Starting with that choice, it is proposed to simplify the structure of the heating assembly by sub-dividing the electric radiator into a plurality of independent heating elements, each of which is associated with at least one elementary electric heating body, in particular one with a positive temperature coefficient, and at least one finned element. Such a structure for the electric radiator affords simplification and size limitation, not only of the electric radiator intrinsically, but also the means for assembling together the electric radiator and main radiator.

More precisely, the structure of the electric radiator obtained in this way is assembled to the main radiator by making use of the latter as a structure for carrying the heating elements of the electric radiator, either individually or through at least one framework on which the heating elements of the electric radiator are assembled. These latter are preferably placed as close as possible to one of the major faces of the main radiator, which may equally well be either its downstream face and/or its upstream face with respect to the direction of air flow, and, in particular, they are either held flat against the latter by means of the framework, or else they are placed inside it. In the latter case, the heating elements of the electric radiator are for example carried by the flanges or placed inside the housings formed in the face of the main radiator, and in particular the finned elements of the latter. In another example, the elementary bodies of the electric radiator are disposed between the extensions of the finned elements of the main radiator, which are preferably made use of not only to carry the elementary bodies of the electric radiator, but also to constitute the finned elements of the electric radiator.

It will be understood that, in accordance with the present invention, bearing on the choice of the above mentioned distinction between the heat exchange surfaces as between one of the two radiators and the other, namely the main radiator and electric radiator, the heating elements of the latter are exclusively disposed on the main radiator without any geometric surface superposition with the tubes of the main radiator, including the case where the heating elements of the electric radiator are located inside the face of the main radiator. As a result, the heating assembly of the present invention associates a main radiator and an electric radiator in a distinct manner, the respective heat exchange surfaces of the two radiators being held spaced away from each other in the direction of the air flow.

In accordance with another approach of the present invention, a heating assembly is proposed which associates a main radiator with elementary electric heating bodies, in particular those with constant temperature coefficient or similar, which are located in contact with the finned elements of the main radiator. The elementary bodies of the electric radiator are more particularly placed so that they are spaced away, upstream or downstream, from the tubes of the main radiator in the direction of the air flow. In particular, and in a first embodiment, the elementary bodies of the electric radiator are interposed between the extensions of the finned elements of the main radiator, with these extensions constituting, firstly, finned elements of the electric radiator, and secondly, members for joining together the elementary bodies of the electric radiator in such a way that they are spaced apart, albeit close together, from the tubes of the main radiator in the direction of the air flow. In particular again, and in a second embodiment, the elementary bodies of the electric radiator are fixed against at least one of the major faces, downstream and/or upstream, of the main radiator in the direction of the air flow, and more precisely against the finned elements of the latter. This fastening is achieved by means of an interposed framework for carrying the elementary bodies of the electric radiator, with which finned elements are associated so as to constitute a plurality of heating elements of the electric radiator.

In accordance with a general definition of the present invention, the proposed heating assembly is, in particular, adapted for equipment of a heating, ventilating and/or air conditioning installation, especially for a cabin of a vehicle. This heating assembly comprises a main radiator for flow of a fluid, comprising at least one manifold having input and output ports for the fluid, between which a plurality of tubes extends to provide flow of the fluid through them. These tubes are interposed between, and along, a plurality of finned elements. This heating assembly also includes an electric radiator comprising at least one electric heating member interposed between a plurality of finned elements and having means for connection to an electric power source and to electronic control devices. This heating assembly further includes means for assembly of the main radiator and electric radiator together.

Such a heating assembly is recognisable mainly in general dispositions of the present invention, in that the body of the electric radiator is sub-divided into a plurality of independent heating elements, each of which comprises at least one elementary electrical heating body having the said respective connecting means together with at least one finned element. The plurality of heating elements is assembled on a structure for connecting the electric radiator on at least one face of the main radiator, and in particular on at least one of its upstream or downstream major faces in the direction of flow of the air, so defining its general plane. It will be understood that the assembled heating elements preferably define a generally flat assembly which is disposed parallel to the face of the main radiator and spaced apart from the tubes of the latter, being attached by means of the connecting structure which, in accordance with various versions, either consists of a framework or the like, or is formed directly from the face of the main radiator, and especially from the finned elements of the latter.

DESCRIPTION OF THE DRAWINGS

The present invention will be understood more clearly on a reading of the following detailed description, which will consist of embodiments by way of example, with reference to the drawings on the attached sheets, in which:

FIG. 6, FIG. 7 and FIG. 8 are diagrammatic views in profile of a heating assembly of the present invention, respectively showing various embodiments.

FIG. 9 and FIG. 10 are diagrams illustrating a heating element of an electric radiator in a heating assembly of the present invention, in various respective embodiments.

Figure 1:
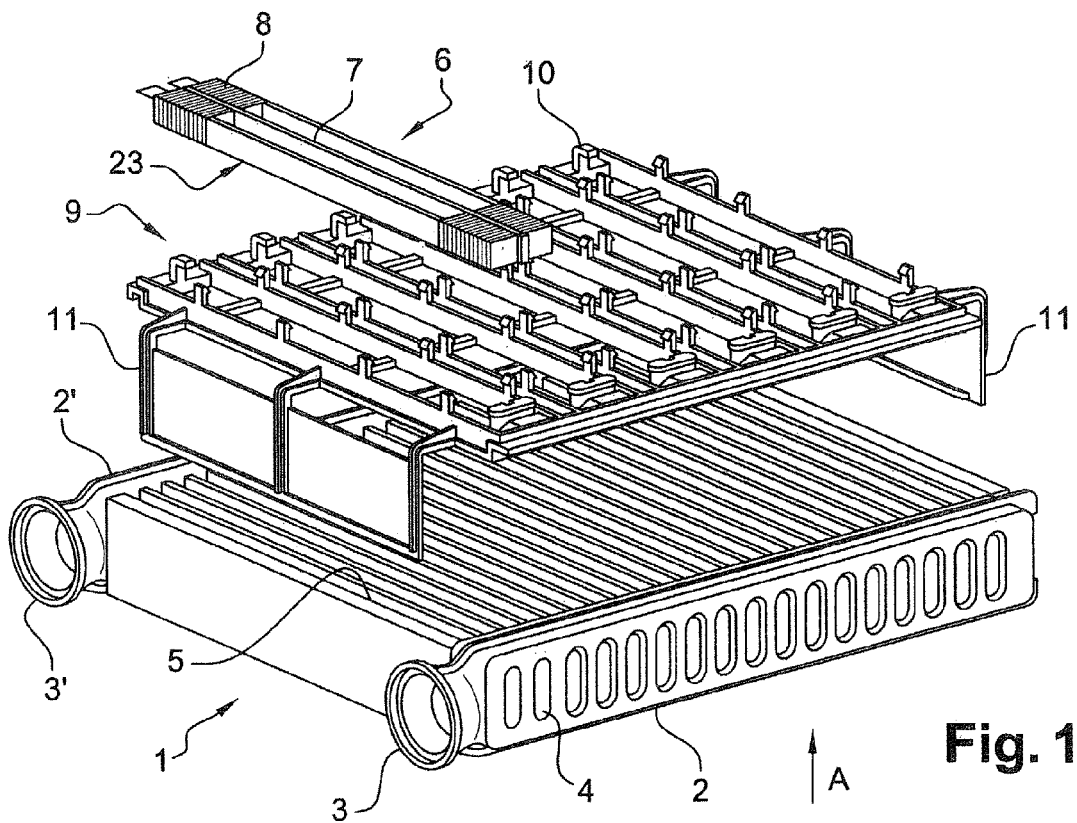
FIG. 1 and FIG. 2 are illustrations of a heating assembly in a first embodiment of the present invention, seen in exploded perspective and assembled perspective respectively.

It will be recalled that a main radiator 1 of a heating assembly in an installation for heating, ventilating and/or air conditioning of the cabin of a vehicle is of the fluid flow type, such as is illustrated in particular for example in FIG. 1. This main radiator 1 includes manifolds 2, 2', which are provided, respectively, with an input port 3 and an output port 3' for the liquid used for cooling the engine of the vehicle. The manifolds 2 and 2' are connected with tubes 4 which are interposed between and along a plurality of finned elements 5. It will be noted at this stage of the description that the main radiator 1 shown in the drawings is of the so-called "I" type, but that the parts of this radiator are capable of being arranged in relation to each other in any way whatsoever, without in so doing departing from the scope of the present invention. Such a main radiator 1 is adapted to be equipped with an electric radiator, as an accessory which is attached to it on its downstream face in the direction of flow of the air which is blown by the installation, as indicated by the arrow A in the drawings. It will be noted that the downstream position is given by way of example, the electric radiator of the present invention being able to be attached on either one or other of the major faces of the main radiator 1 which define its general plane. The electric radiator consists of a plurality of heating elements 6, in which an elementary electric heating body 7 and at least one finned element 8 are associated, and these heating elements 6 are assembled on a structure joining the electric radiator to the main radiator 1.

Figure 2:
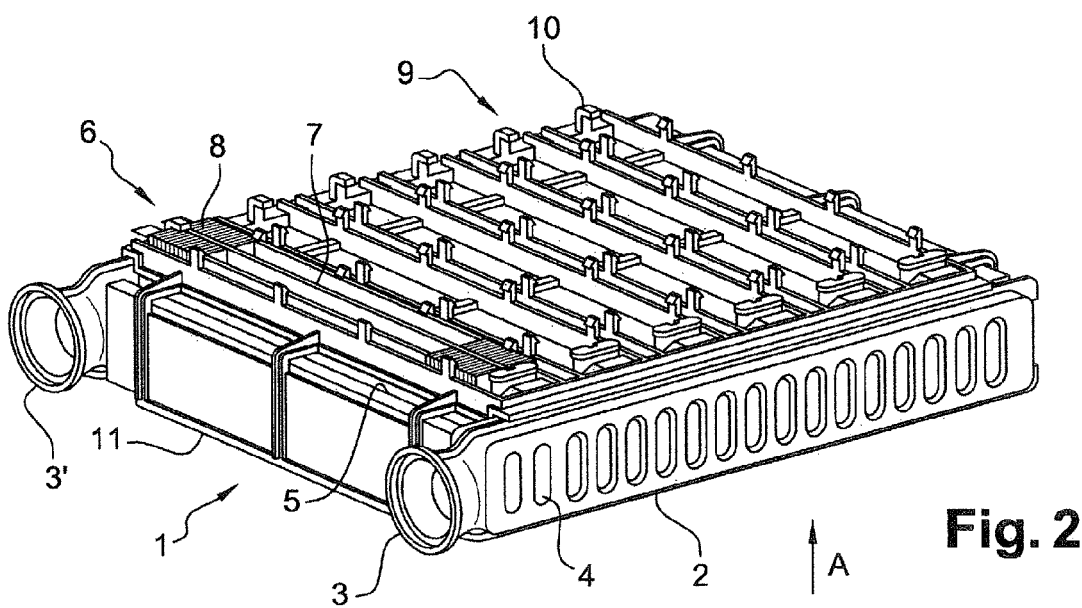
Figure 4:
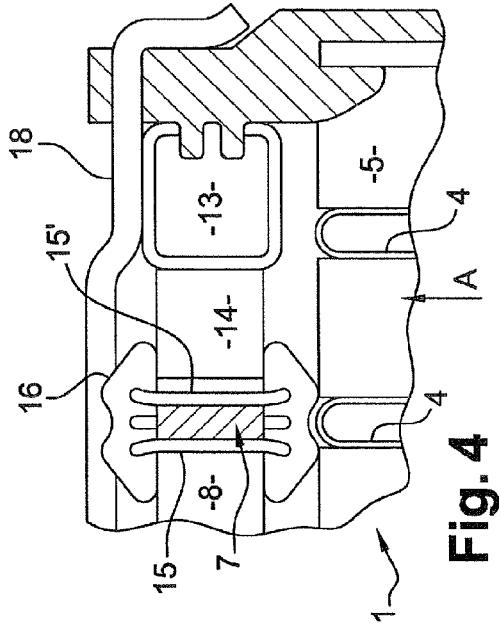
FIG. 4 is a structural detail of a further embodiment of a heating assembly in accordance with the second embodiment mentioned above.
Figure 5:
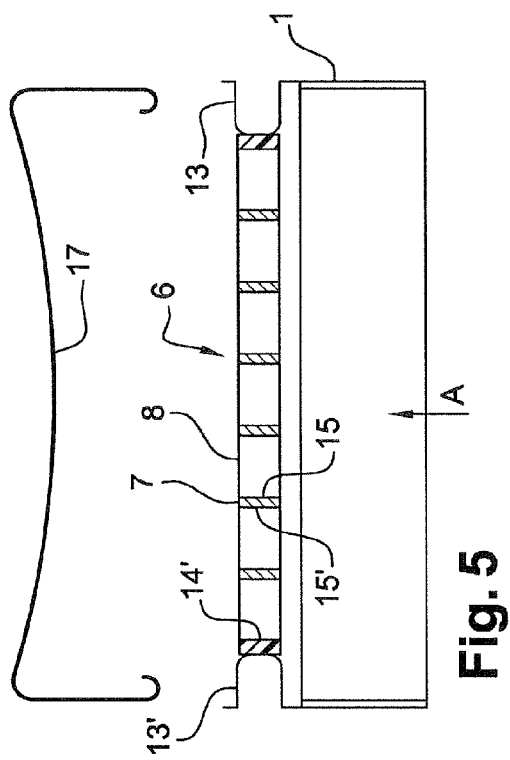
FIG. 5 is an exploded profile view of the heating assembly shown in FIG. 3.
Figure 3:
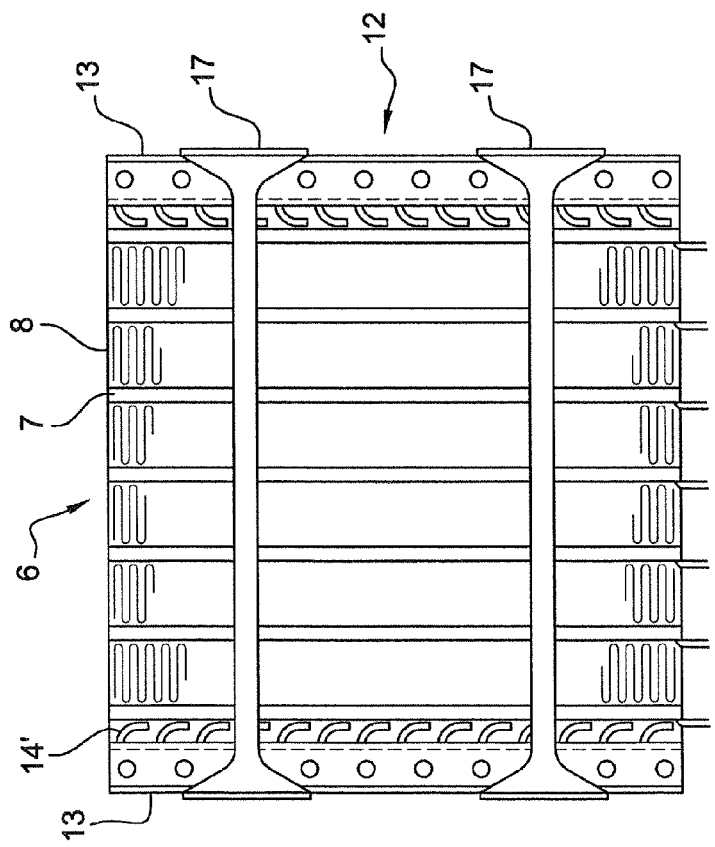
FIG. 3 is a diagrammatic front view showing an embodiment of a heating assembly in a second version of the present invention.

In the various embodiments shown in FIG. 1 and FIG. 2 on the one hand, and in FIG. 3 to FIG. 5 on the other hand, the junction structure consists of a generally flat framework, which is equipped with members for receiving the heating elements 6 and with means for fastening against the downstream face of the main radiator 1. These means for fastening the framework on the main radiator preferably consist of a deformable resilient member, which is in engagement on the framework and on the main radiator 1. These arrangements are such that the connection between the framework and the main radiator 1 is obtained by mutual elastic gripping, by means of the fastening member against the deformation of the latter. In the embodiments shown, these advantageous connecting arrangements work by elastic gripping. However, the junction between the framework and the main radiator 1 is capable of being made using other known means, without detracting from the general scope of the present invention.

More particularly, in the embodiment shown in FIG. 1 and FIG. 2, the framework, 9, is made in the form of an open skeleton or similar arrangement, in which the framework 9 is formed as a rigid structure which is largely open. This skeletal framework 9 is equipped with a plurality of members 10 for receiving the respective heating elements 6, which are preferably made deformable so as to enable a connection by elastic engagement of the heating elements 6 on the skeleton 9 to be obtained. As to the means for fastening the framework 9 on the main radiator 1, these consist for example of flexible plates 11 which are formed laterally on the framework 9. The framework 9 preferably consists of a monobloc element which is preferably formed by moulding in a plastics material.

More particularly, again, in the embodiments shown in FIG. 3, FIG. 4 and FIG. 5, the framework, 12, consists mainly of a set of straight lugs 13, 13', which are joined together, and spaced apart from each other, by traverses. The heating elements 6 are disposed, and are held together between the straight lugs 13 and 13', by gripping action. More precisely, the heating elements 6 are preferably assembled in succession to each other, and are then inserted together between the lugs 13, 13' by means of resilient insert means 14, 14'. These latter components 14 and 14' are in particular arranged on the straight lug 13 and on the straight lug 13' so as to exert opposing elastic gripping thrusts laterally against the group of heating elements 6 assembled together. In the preferred embodiment of the assembly of the heating elements 6 shown in FIG. 4, the heating elements 6 are assembled to each other by assembly means in each of which a set of metallic plates 15, 15', made for example of aluminium or the like, which are disposed on either side of the elementary bodies 7, are associated with the finned elements 8 between which they are interposed. The plates 15 and 15' are joined together along their sides by halter pieces 16, which are preferably of insulating material, or by some equivalent fastener engaged on each of the plates 15 and 15'. The means for fastening the framework 12 on the main radiator 1 consist for example of an independent fastening member 17, 18, such as a resiliently deformable strut. In the embodiment of FIG. 5 for example, this fastening member 17 spans both the framework 12 and the main radiator 1, which it grips by means of a hook on its rear face, while in the version shown in FIG. 4, the fastening member 18 is in engagement on the main radiator 1 by means of co-operating reliefs. It will be noted that these ways of arranging the independent fastening member 17 or 18, acting as a strut, are given only by way of example and for purposes of illustration, and that the fastening member may for example be sub-divided into a plurality of elements.

It will be understood, with regard to the various examples shown of embodiments of fastening members 11, 17, or 18, with elastic deformation between the framework 9 or 12 and the main radiator 1, that these examples of embodiments can be transposed from one to the other of the various versions of the framework 9 or 12 without in any way departing from the corresponding general scope set forth.

In the various embodiments shown in FIG. 6 to FIG. 8, the junction structure consists mainly of the main radiator 1 itself, which comprises a plurality of receiving elements for the respective reception of the heating elements 6. For example, in FIG. 6 the elements for receiving the heating elements 6 consist of housings 19 which are formed on at least one face of the main radiator 1 in its general plane. In another modified embodiment shown in FIG. 7, the receiving elements for the heating elements 6 consist of flanges 20, or hooks, or resiliently deformable elements or the like, which are attached on the main radiator 1 in its general plane. In a further embodiment, which is shown in FIG. 8, the members for receiving the heating elements 6 are formed from extensions 21 of two neighbouring finned elements 5 of the main radiator 1. These extensions 21 preferably constitute the finned elements 8 of the heating elements 6, by receiving between them the elementary bodies 7 which form part of the heating elements 6. In regard to this last modified version, it will be noted that in the case where the space defined between two extensions 21 is not occupied by an elementary body 7 of the electric radiator, this space is preferably occupied by a seal 22 of thermally insulating material.

Reverting to FIG. 1, the heating elements 6 of the electric radiator consist mainly, for example, of a frame 23 which envelops a pair of finned elements 8 disposed on either side of the elementary body 7, and made in particular from a material with a positive temperature coefficient or the like. The frame 23 is preferably formed by electrodes for supplying power to the elementary body 7. It will be noted that this version of the heating elements 6 can be transposed to the various other modified embodiments of the invention which are shown in the drawings, given that it is necessary that these modified versions should feature a heating element 6 which is mounted on an independent chassis, which consists of the frame 23 in the example shown here, together with at least one elementary body 7 and at least one finned element 8.

In FIG. 9 and FIG. 10, various examples of forms of elementary bodies 7 are shown respectively, these being adapted to cooperate with extensions 21 of the finned elements 5 of the main radiator 1, such as in the version shown in FIG. 8. In FIG. 9 for example the elementary body 7 consists of one or more positive temperature coefficient elements 24, of which at least one end is bonded to the electrodes 25, extending over the whole surface of the elementary body 7. In the version shown in FIG. 10, the elementary body 7 consists mainly of a metal plate 26 which includes at least one track 27 constituting a resistance and preferably carrying at least one electronic control device, such as that indicated at 28.

Figure 13:
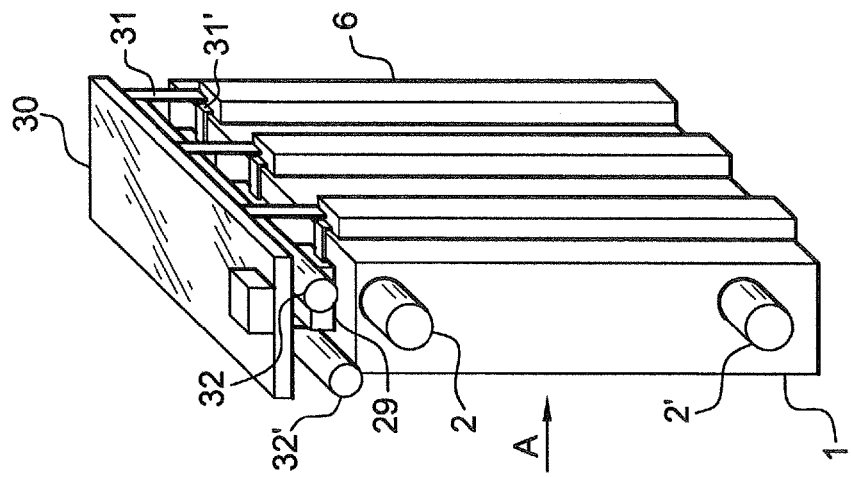
FIG. 11, FIG. 12 and FIG. 13 are diagrammatic perspective views of various modified arrangements of the control members for an electric radiator forming part of a heating assembly of the present invention.
Figure 12:
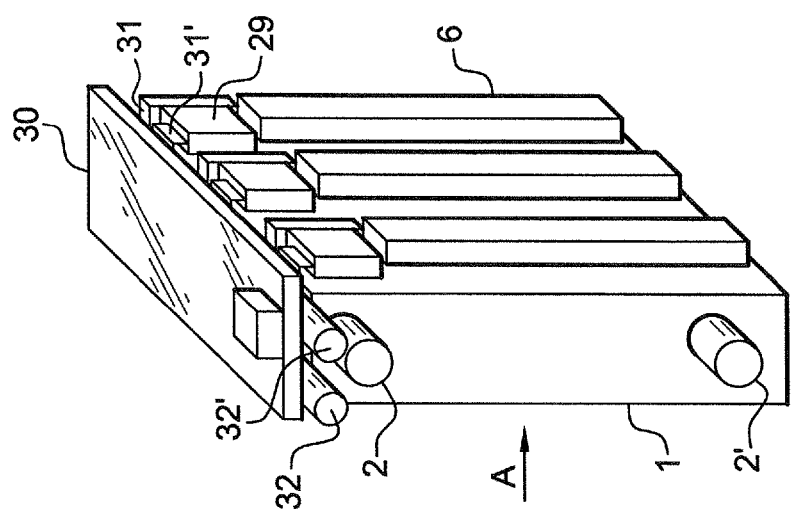
Figure 11:
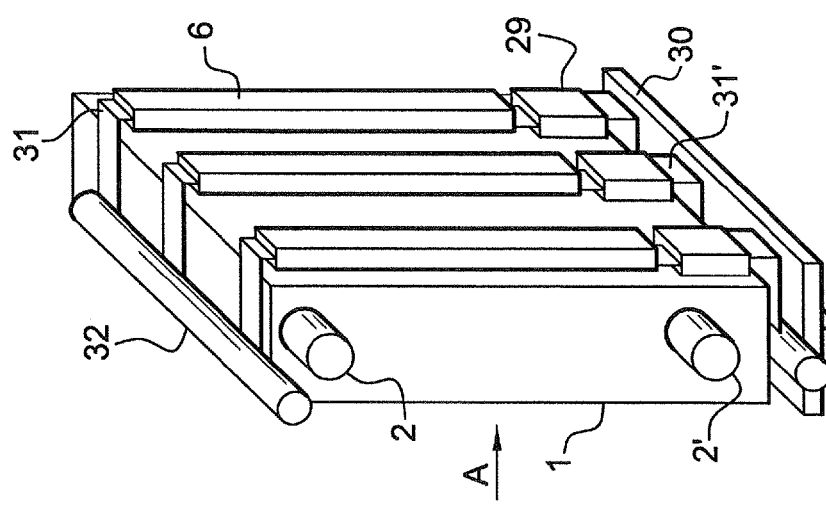

In FIG. 11 to FIG. 13, the electric radiator is provided with means for connection to the electrical power source of the vehicle and to electronic control devices. These latter consist in particular of at least one switch 29 associated with a printed circuit board 30. In particular, these switches 29 are related to each of the heating elements 6. As to the means for connecting the elementary body 7 to the electrical power source of the vehicle, these consist in particular of a pair of lugs 31 and 31' or the like, for connecting them to a pair of profiled elements 32 and 32' respectively, which are associated with the electrical power source of the vehicle. The electronic circuit board 30 in particular is fixed close to any one of the sides of the main radiator 1. As to the switch or switches 29, these are located in any one of the sides of the main radiator 1, for example on one of its major faces.

In FIG. 11 for example, the electronic circuit board 30 is located on the lower side of the main radiator 1, while the switches 29 associated with the heating elements 6, being less fragile, are located against the front face of the main radiator 1. In the versions shown in FIG. 12 and FIG. 13, the electronic circuit board 30 is located on the upper face of the main radiator 1, while, as regards the switches 29 associated with the heating elements 6, these are located either on the front face of the main radiator 1 as shown in FIG. 12, or on one of the sides of the main radiator 1 such as the top face in the example shown in FIG. 13. It will be noted that in these various versions, the connecting lugs 31 and 31' project at the ends of the heating elements 6 indifferently, that is to say either at a common end such as in the embodiments in FIG. 12 and FIG. 13, or at the respective opposite ends as in the embodiment shown in FIG. 11.

The invention claimed is:

1. A heating assembly for a heating, ventilating and/or air conditioning installation, especially for a cabin of a vehicle, which assembly comprises, in combination, a main radiator (1) for flow of fluid, including at least one manifold (2, 2') having ports (3, 3') for inlet and outlet of the fluid, between which there extends a plurality of tubes (4) for flow of the fluid therein, which are interposed between and along a plurality of finned elements (5) to define a heat exchange surface of the main radiator (1) relative to a direction of air flow, together with an electric radiator comprising a body defining a heat exchange surface of the electric radiator relative to the direction of air flow, which comprises at least one electrical heating member interposed between a plurality of finned elements (8) and having means (31, 31') for connection to an electrical source and to electronic control devices (28, 29, 30), the heating assembly further including means for assembling together the main radiator (1) and the electric radiator, characterised in that the heat exchange surface of the electric radiator is distinct from the heat exchange surface of the main radiator (1) with the body of the electric radiator is subdivided into a plurality of independent heating elements (6) disposed adjacent to and upstream and/or downstream to at least one face of the main radiator (1) relative to the direction of air flow and assembled on a junction structure for joining the electric radiator on the at least one face of the main radiator (1), and the electronic control devices comprise at least one switch (29) associated with an electronic printed circuit board (30), with means for connecting at least one elementary body (7) of the heating elements (6) comprising a pair of connecting lugs (31, 31') for connection to a pair of profiled elements (32, 32') associated with the electrical power source of the vehicle, and in that the electronic printed circuit board (30) is fixed close to any one of the sides of the main radiator (1), the switch (29) being located indifferently on any one of the sides of the main radiator (1) or on one of the faces of the latter, and the elementary body (7) comprises a metal plate (26) having at least one resistive track (27).

2. A heating assembly according to claim 1, characterised in that the junction structure comprises a framework (9, 12) which is equipped with members (10; 13, 13') for receiving heating elements (6), together with fastening means (11, 17, 18) for fastening against the face of the main radiator (1).

3. A heating assembly according to claim 2, characterised in that the framework (9) is arranged as a rigid structure which is largely open and which is equipped with a plurality of members (10) for receiving the respective heating elements (6).

4. A heating assembly according to claim 3, characterised in that the said members (10) for receiving the heating elements (6) are resiliently deformable whereby to connect heating elements (6) on the framework (9) by elastic insertion.

5. A heating assembly according to claim 2, characterised in that the framework (12) comprises a set of straight lugs (13, 13') which are connected to each other, and between which the heating elements (6) are disposed and held together by gripping engagement.

6. A heating assembly according to claim 5, characterised in that the heating elements (6) are assembled together in succession, and are inserted between the straight lugs (13, 13') through elastic interposition means (14, 14').

7. A heating assembly according to claim 6, characterised in that the heating elements (6) are assembled together by assembly members, each of which comprises, in combination, a set of metallic plates (15, 15'), which are disposed on either side of the elementary bodies (7) by being interposed with the finned elements (8), and which are connected together at their edges by halter pieces (16), which are preferably of insulating material.

8. A heating assembly according to any one of claims 2 to 7, characterised in that the means for fastening the framework (9, 12) on the main radiator (1) comprises an elastically deformable member (11, 17, 18) in engagement on the framework (9, 12) and on the main radiator (1), such that their connection to each other is obtained by mutual elastic gripping by means of the fastening member (11, 17, 18) against the action of its deformation.

9. A heating assembly according to claim 1, characterised in that the junction structure comprises the main radiator (1) which includes a plurality of receiving members (19, 20, 21) of the respective heating elements (6).

10. A heating assembly according to claim 9, characterised in that the receiving members for receiving the heating elements (6) comprises housings (19) formed on at least one face of the main radiator (1).

11. A heating assembly according to claim 9, characterised in that the receiving members for receiving the heating elements (6) comprise flanges (20) which are attached to the main radiator (1) on at least one of its faces.

12. A heating assembly according to claim 9, characterised in that the receiving members for receiving the heating elements (6) are formed from extensions (21) of two finned elements (5) of the main radiator (1) which are close together, the said extensions (21) constituting the finned elements (8) of the heating elements (6) and receiving between them the elementary bodies (7) of the latter (6).

13. A heating assembly according to claim 1, characterised in that the connecting lugs (31, 31') of the elementary body (7) project from the ends of the heating elements (6), either at a common end or at respective opposite ends thereof.

14. A heating assembly according to claim 1, characterised in that the heating elements (6) comprise a frame (23) enveloping a pair of finned elements (8) which are disposed on either side of the elementary body (7), the latter comprising at least one electrical heating element.

15. A heating assembly according to claim 14, characterised in that the frame (23) comprises power supply electrodes of the elementary body (7).

16. A heating assembly according to claim 1, characterized in that the independent heating elements (6) each comprise of at least one elementary electrical heating body (7) having respective connecting means (31, 31') and at least one finned element (8).

17. A heating assembly according to claim 16, characterized in that the elementary electrical heating body (7) is spaced upstream or downstream away from the tubes (4) of the main radiator (1) relative to the direction of air flow.

* * * * *